United States Patent
Hoppe

(10) Patent No.: US 8,022,587 B2
(45) Date of Patent: Sep. 20, 2011

(54) ELECTRICAL MACHINE WITH NONUNIFORM POLE TEETH

(75) Inventor: Thomas Hoppe, Altdorf (DE)

(73) Assignee: Siemens Aktiengesellschaft, München (DE)

(*) Notice: Subject to any disclaimer, the term of this patent is extended or adjusted under 35 U.S.C. 154(b) by 345 days.

(21) Appl. No.: 12/278,221

(22) PCT Filed: Jan. 31, 2007

(86) PCT No.: PCT/EP2007/050940
§ 371 (c)(1),
(2), (4) Date: Dec. 15, 2008

(87) PCT Pub. No.: WO2007/090776
PCT Pub. Date: Aug. 16, 2007

(65) Prior Publication Data
US 2010/0013327 A1    Jan. 21, 2010

(30) Foreign Application Priority Data
Feb. 3, 2006 (DE) .................. 10 2006 005 046

(51) Int. Cl.
*H02K 41/03* (2006.01)
*H02K 19/10* (2006.01)
(52) U.S. Cl. ............... 310/181; 310/12.18; 310/166; 310/216.073; 310/216.071; 310/216.072; 310/12.24
(58) Field of Classification Search ........... 310/12.18, 310/181, 12.24, 12.27, 166, 168, 216.071–216.073
See application file for complete search history.

(56) References Cited

U.S. PATENT DOCUMENTS
4,370,577 A * 1/1983 Wakabayashi et al. .... 310/12.24
(Continued)

FOREIGN PATENT DOCUMENTS
DE    198 48 790 A1    4/1999
(Continued)

OTHER PUBLICATIONS
Machine Translation of "Linear Motor", JP 2005185061, Jul. 7, 2005, Motosumi et al.*

*Primary Examiner* — Karl Tamai
(74) *Attorney, Agent, or Firm* — Henry M. Feiereisen; Ursula B. Day

(57) ABSTRACT

Electric machines which are excited with permanent magnets are to be improved in terms of their smoothness of operation and their loss properties. For this purpose, an electric machine is proposed comprising a first active part (40) on which one electric magnet (41, 42) and at least one permanent magnet (44) are mounted, and a second active part (43) which has a multiplicity of pole teeth (45, 46) and which interacts magnetically with the first active part (40). The pole teeth (45, 46) are spaced apart from one another in a non-uniform fashion in the direction (3) of the movement of the electric machine and/or have different average widths from one another, with the respective width of a tooth being measured in the direction (3) of movement and being averaged in terms of the extent of the tooth in the transverse direction with respect to the direction of travel. The geometry of the tooth causes the harmonics of the magnetic field to be influenced in a selective fashion. The second active part can be implemented cost-effectively as, for example, a simple punched sheet-metal part.

5 Claims, 2 Drawing Sheets

U.S. PATENT DOCUMENTS

| | | | | |
|---|---|---|---|---|
| 4,504,750 A | * | 3/1985 | Onodera et al. | 310/12.21 |
| 4,705,971 A | * | 11/1987 | Nagasaka | 310/12.01 |
| 4,713,570 A | * | 12/1987 | Mastromattei | 310/181 |
| 4,912,746 A | * | 3/1990 | Oishi | 310/12.01 |
| 4,972,108 A | * | 11/1990 | Venturini | 310/12.22 |
| 5,081,381 A | * | 1/1992 | Narasaki | 310/12.27 |
| 5,218,250 A | * | 6/1993 | Nakagawa | 310/12.21 |
| 6,087,742 A | * | 7/2000 | Maestre | 310/12.24 |
| 6,239,530 B1 | * | 5/2001 | Garcia | 310/216.109 |
| 6,522,035 B1 | * | 2/2003 | Smit | 310/12.18 |
| 6,960,858 B2 | * | 11/2005 | Kawai | 310/181 |
| 7,154,198 B2 | * | 12/2006 | Kawai | 310/12.15 |
| 7,859,142 B2 | * | 12/2010 | Armeit et al. | 310/12.24 |
| 7,863,782 B2 | * | 1/2011 | Matscheko et al. | 310/12.18 |
| 2010/0013327 A1 | * | 1/2010 | Hoppe | 310/12.25 |

FOREIGN PATENT DOCUMENTS

| | | | |
|---|---|---|---|
| DE | 101 24 415 | A1 | 11/2002 |
| DE | 102 48 771 | A1 | 4/2004 |
| EP | 1 045 509 | A1 | 10/2000 |
| JP | 60106356 | * | 6/1985 |
| JP | 62007362 | * | 1/1987 |
| JP | 2280655 | A | 11/1990 |
| JP | 8205514 | A | 8/1996 |
| JP | 09009606 | * | 1/1997 |
| JP | 2005185061 | A | 7/2005 |
| WO | WO 00/22715 | A1 | 4/2000 |
| WO | WO 00/25409 | A1 | 5/2000 |
| WO | WO 03/058794 | A1 | 7/2003 |

* cited by examiner

ELECTRICAL MACHINE WITH NONUNIFORM POLE TEETH

BACKGROUND OF THE INVENTION

The present invention relates to an electrical machine with a first active part, on which at least one electromagnet and at least one permanent magnet are fitted, and a second active part, which has a large number of pole teeth and which interacts magnetically with the first active part.

Linear motors typically have the design as is reproduced schematically in FIG. 1. A primary part 1 is capable of moving over a secondary part 2 in the travel direction 3. The primary part has teeth 4 which are of uniform width and are spaced apart uniformly. A coil 5 is wound around each of these teeth 4. This is referred to as concentrated coils in the primary part 1. Such a design of a linear motor has the disadvantage, however, that construction-related harmonics of the magnetic field impair the synchronism of the motor.

In order to avoid this disadvantage, a linear motor has been developed in which the primary part has teeth of different widths. Such a linear motor is sketched in FIG. 2. The primary part 10 in this case has wide teeth 11 and narrow teeth 12. A coil 13 is wound around each wide tooth 11. The secondary part 14 has permanent magnets 15 and therefore has the same construction as the secondary part 2 of the linear motor in FIG. 1. A torque motor of this type with a small tooth between the coils is described, inter alia, in the documents DE 101 24 415 A1 and DE 102 48 771 A1.

One disadvantage of the linear motors in FIG. 1 and FIG. 2 consists in the fact that the secondary part is complex in terms of manufacture and expensive permanent magnets are required along the entire travel path.

SUMMARY OF THE INVENTION

The object of the present invention is therefore to propose an electrical machine which can be produced inexpensively and in which reduced force ripple or a reduction in the harmonics during operation is provided.

This object is achieved according to the invention by an electrical machine with a first active part, on which at least one electromagnet and at least one permanent magnet are fitted, and a second active part, which has a large number of pole teeth and which interacts magnetically with the first active part, the pole teeth being spaced apart nonuniformly with respect to one another along the travel direction of the electrical machine and/or having different mean widths than one another, the respective width of a tooth being measured in the travel direction and the mean for this width being determined in the extent of the tooth transverse to the travel direction.

Advantageously, the harmonics of the electrical machine according to the invention can be reduced in a simple manner by means of the special laminate cutting technique used for the second active part. Then, there are also no small teeth to disrupt the winding process for the larger teeth of the primary part.

The electrical machine according to the invention can be in the form of an electric motor and in particular in the form of a linear motor. In this case, the first active part corresponds to the primary part and the second active part corresponds to the secondary part of the linear motor. In this case, the particular advantage then again is provided that the secondary part can be produced very inexpensively for long travel paths, with at the same time a low force ripple being provided by the nonuniform pole teeth of the secondary part.

A torque motor can also be improved by the technology according to the invention. In this case, the first active part corresponds to the stator and the second active part corresponds to the rotor, or vice versa.

An advantageous configuration of the electrical machine consists in the fact that pole teeth are spaced apart uniformly in a first section of the second active part along the travel direction and nonuniformly in a second section. In a similar manner to this, the pole teeth can also have the same mean width in a first section of the second active part along the travel direction and a different mean width in a second section. It is thus possible, for example in the case of a linear motor, to achieve a situation in which a machine tool operated by the linear motor has eliminated different harmonics in a travel region for the machining than in a travel region for the tool replacement.

Under certain circumstances it is also favorable to design the width of a pole tooth transverse with respect to the travel direction to be nonuniform. This also makes it possible to reduce the force ripple and the harmonics without the costs for the second active part being increased severely.

BRIEF DESCRIPTION OF THE DRAWING

The present invention will now be explained in more detail with reference to the attached drawings, in which.

DETAILED DESCRIPTION OF PREFERRED EMBODIMENTS

The exemplary embodiments outlined below represent preferred embodiments of the present invention.

Figure 1:
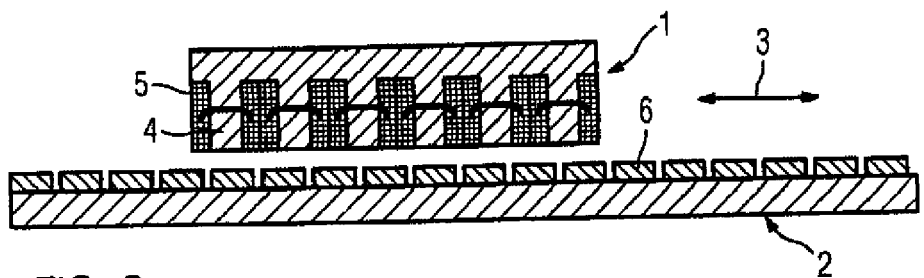
FIG. 1 shows a longitudinal section through a conventional linear motor in accordance with the prior art.
Figure 2:
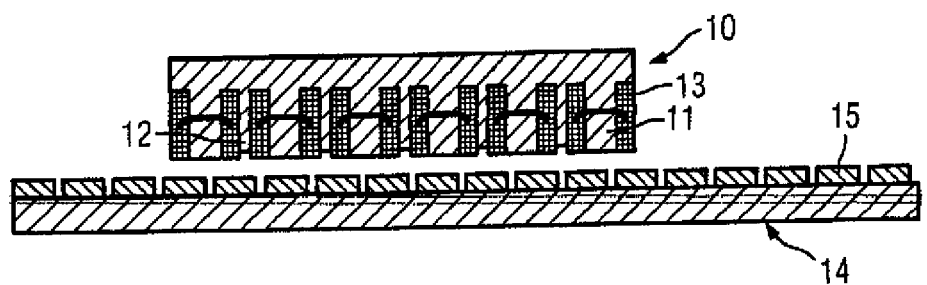
FIG. 2 shows a longitudinal section through a linear motor with teeth of different widths in accordance with the prior art.
Figure 3:
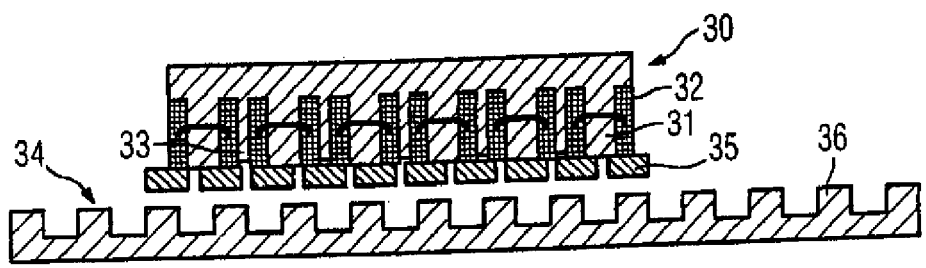
FIG. 3 shows a longitudinal section through a linear motor whose primary part has different teeth and bears the permanent magnets.

First, however, a preliminary stage of the design of a linear motor according to the invention is represented with reference to FIG. 3. The linear motor includes a primary part 30 which is equipped with teeth 31, which are each surrounded by a coil 32. As in the case of the linear motor in FIG. 2, narrow teeth 33 are located between the coils 32. These teeth serve the purpose of eliminating disruptive harmonics. On the side facing the secondary part 34, permanent magnets 35 are arranged on the primary part 30. The secondary part 34 has teeth 36 which are spaced uniformly apart and have uniform widths. Although this configuration of the linear motor results in the advantage that disruptive harmonics are reduced, the winding of the primary part 30 is difficult as a result of the narrow teeth 33. In addition, the primary part 30 is longer than that in FIG. 1 since the narrow teeth 33 are additionally provided.

Figure 4:
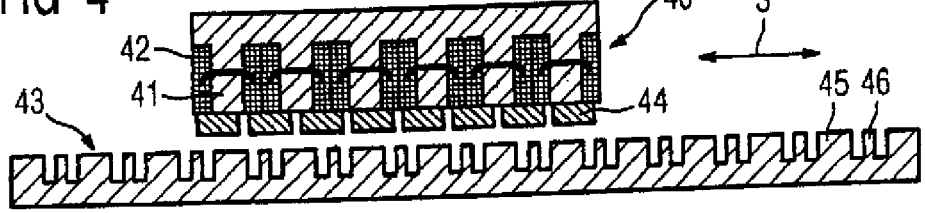
FIG. 4 shows a longitudinal section through a linear motor according to the invention whose secondary part has differently shaped teeth.

A linear motor according to the invention is reproduced in FIG. 4 in longitudinal section and has a primary part 40. Coils 42 are wound around uniformly spaced-apart and shaped teeth 41. Permanent magnets 44 are located on that side of the primary part 40 which faces the secondary part 43. The primary part 40 therefore has a more compact design than the primary part 30 in FIG. 3, since no teeth are provided between the coils.

The secondary part 43 has different teeth 45 and 46. In the present example, for reasons of simplicity only teeth with two different widths, which continuously alternate, are provided in the secondary part 43. The tooth shape and the distance between the teeth in the travel direction 3 can, however, in principle be selected as desired for each tooth so as to arrive at the desired motor characteristic.

Figure 5:
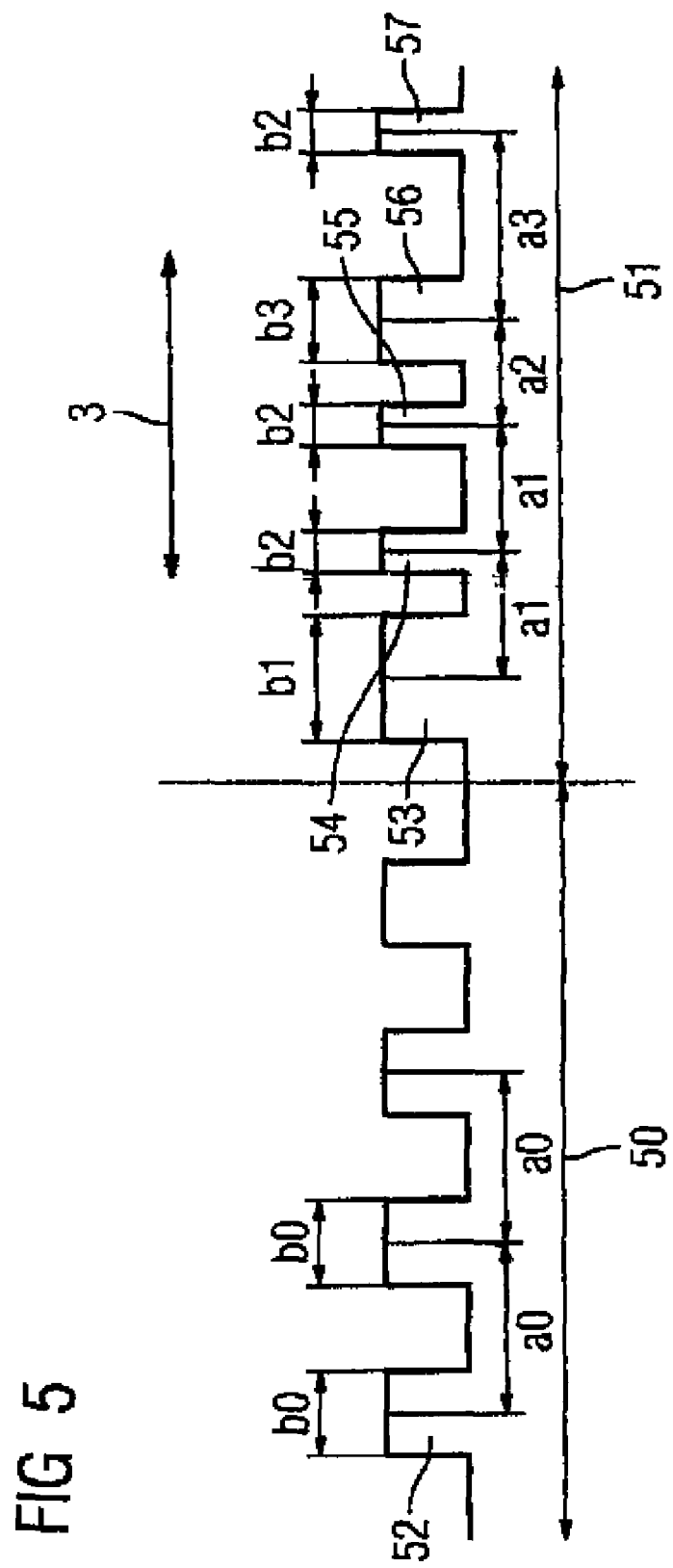
FIG. 5 shows a tooth distribution in accordance with a further embodiment of the present invention.

In accordance with a further embodiment of the present invention, FIG. 5 reproduces a tooth scheme for the secondary part 43 of the linear motor. In a first section 50 of the secondary part, a different pole tooth configuration is selected than in a second section 51 in the travel direction 3. All of the teeth in the travel direction 3 have the same width and are spaced equally apart in the first section 50. They each have the width b0 and the distance a0 from the next tooth.

Adjacent teeth 53, 54 have different widths in the second section 51 of the secondary part. Here, the tooth 53 has the width b1 and the tooth 54 has the width b2. Two adjacent teeth can, however, also have the same width. This is indicated in FIG. 5 by the teeth 54 and 55, which each have the width b2. The distances between adjacent teeth can also be the same or different. In the present example, the teeth 53 and 54 are spaced apart in the same way as the teeth 54 and 55 (distance a1). In contrast, the teeth 55 and 56 are spaced apart at a relatively short distance a2 and the teeth 56 and 57 are spaced apart at a relatively long distance a3. In other words, a first tooth 54 has a different distance a1 from an adjacent second tooth 55 than the second tooth 55 has from its adjacent tooth 56 (distance a2). If, moreover, as is indicated in the example in FIG. 6, the teeth also have different widths, this can be as follows: a first tooth 53 has a width b1, while its adjacent tooth 54 has a different width b2.

The width and distance figures given in connection with FIG. 5 relate to extents in the travel direction 3. If the teeth, however, have nonuniform widths transverse to the travel direction 3, a mean width of the tooth in the travel direction, which mean is determined via the individual widths transverse to the travel direction, can be determined. Then, the abovementioned rules can again be applied to these widths for which the mean has been determined.

Advantageously, the secondary parts configured in this way can be produced very inexpensively for example from stamped laminates or solid parts. The tooth geometry in the secondary part then does not influence the manufacture of the primary part, and in particular not the winding of the teeth.

As a result of the different configuration of sections of the secondary part, disruptive effects can be eliminated in a positionally dependent manner. Thus, for example in the case of a machine tool, the harmonics in a machining region can be influenced differently than in a region in which tool replacement takes place.

By means of a suitable tooth geometry, the harmonics can be influenced in such a way that, for example, less force ripple or less tilting of the primary part can be achieved. Thus, a manifold improvement in the synchronism can be achieved and the losses can be reduced.

What is claimed is:

1. An electrical machine, comprising:
   a first active part for attachment of at least one electromagnet and at least one permanent magnet; and
   a second active part interacting magnetically with the first active part and having a first section and a second section, wherein the first and second sections do not overlap, the first section having a first plurality of pole teeth, each pole tooth of the first section having an average width that is different from a width of the nearest pole tooth, wherein the first plurality of pole teeth of the first section are spaced apart nonuniformly with respect to one another along a travel direction of the electrical machine, with a gap between a pole tooth and an adjacent pole tooth on one side of the pole tooth being different from a gap between the pole tooth and an adjacent pole tooth on another side of the pole tooth for all pole teeth of the first section, the second section having a second plurality of pole teeth which are spaced apart uniformly along the travel direction, with the second plurality of pole teeth spaced apart uniformly in the travel direction, each pole tooth of the second section having an average width identical to the width of an adjacent pole tooth, wherein the width of a pole tooth is averaged perpendicular to the travel direction.

2. The electrical machine of claim 1, constructed in the form of an electric motor.

3. The electrical machine of claim 2, constructed in the form of a linear motor, wherein the first active part is a primary part and the second active part is a secondary part of the linear motor.

4. The electrical machine of claim 2, constructed in the form of a torque motor, wherein the first active part is a stator and the second active part is a rotor of the torque motor.

5. The electrical machine of claim 1, wherein the width of a pole tooth transverse to the travel direction is nonuniform.

* * * * *